United States Patent [19]

van der Meulen

[11] 4,023,470
[45] May 17, 1977

[54] METHOD AND APPARATUS FOR CONTINUOUS PRODUCTION OF BAGS FROM THERMOPLASTIC FILM

[76] Inventor: Leonard van der Meulen, Impasse Ibn Chabbat Immeuble Djerid A, Tunis, Tunisia

[22] Filed: Jan. 10, 1975

[21] Appl. No.: 539,943

[30] Foreign Application Priority Data

Jan. 19, 1974 Germany .................. 2404545

[52] U.S. Cl. .............................. 93/35 R; 93/33 H
[51] Int. Cl.² ................................... B31B 23/00
[58] Field of Search ........... 93/DIG. 1, 33 R, 33 H, 93/35 R, 8 R, 14–26; 156/521, 515, 582, 583

[56] References Cited

UNITED STATES PATENTS

| | | | |
|---|---|---|---|
| 2,737,859 | 3/1956 | Allison et al. ............... | 93/8 R |
| 2,909,969 | 10/1959 | Styers ........................ | 93/8 R |
| 2,982,187 | 5/1961 | Stelling, Jr. ................. | 93/8 R |
| 3,004,881 | 10/1961 | van der Meulen ............ | 93/8 R X |
| 3,221,613 | 12/1965 | Sanders ...................... | 93/8 R |
| 3,404,059 | 10/1968 | Ritterhoff ................... | 156/521 X |
| 3,722,376 | 3/1973 | Wech ......................... | 93/8 R |
| 3,838,631 | 10/1974 | Simpson et al. ............. | 93/33 H X |

*Primary Examiner*—James F. Coan
*Attorney, Agent, or Firm*—P. D. Golrick

[57] ABSTRACT

A method for continuous fabrication of bags from a longitudinally advanced two-layer thermoplastic film web fed tangentially onto a rotating drum for carrying out transverse web seam welding and severing, with high speed operations facilitated by tensioning the web as it is being fed onto the drum, and with web tension release just before or as the seam welding is effected to ensure good quality seaming. Apparatus including a continuously rotating welding drum; circumferentially spaced resiliently mounted projecting longitudinal welding anvils; a welding bar engageable with the web on the anvils; feed rolls spaced from and a web guide roll adjacent the drum tangentially directing web onto the drum to be carried past the welding bar under vacuum gripping to discharge guide tapes; a drum-adjacent bag pick-off vacuum roll passing finished bags to discharge conveyor tapes; a web loop forming tensioner between the feed and guide rolls including a reciprocating loop former roll engageable with one web side; and drive means for effecting a web sealing and severing contact of the welding bar at an anvil, for loop forming roller reciprocation to develop tension drawing the in-fed web taut onto the drum and to release the web tension for welding, and for continuously rotationally driving the drum; the drum having a numerously finely perforated web-accepting circumferential surface and, therebeneath, divided chamber structure between successive anvils, and means for subjecting chambers to web gripping suction and web lifting air pressure to aid discharge of finished bag from the drum. A variant welding bar structure is disclosed.

18 Claims, 6 Drawing Figures

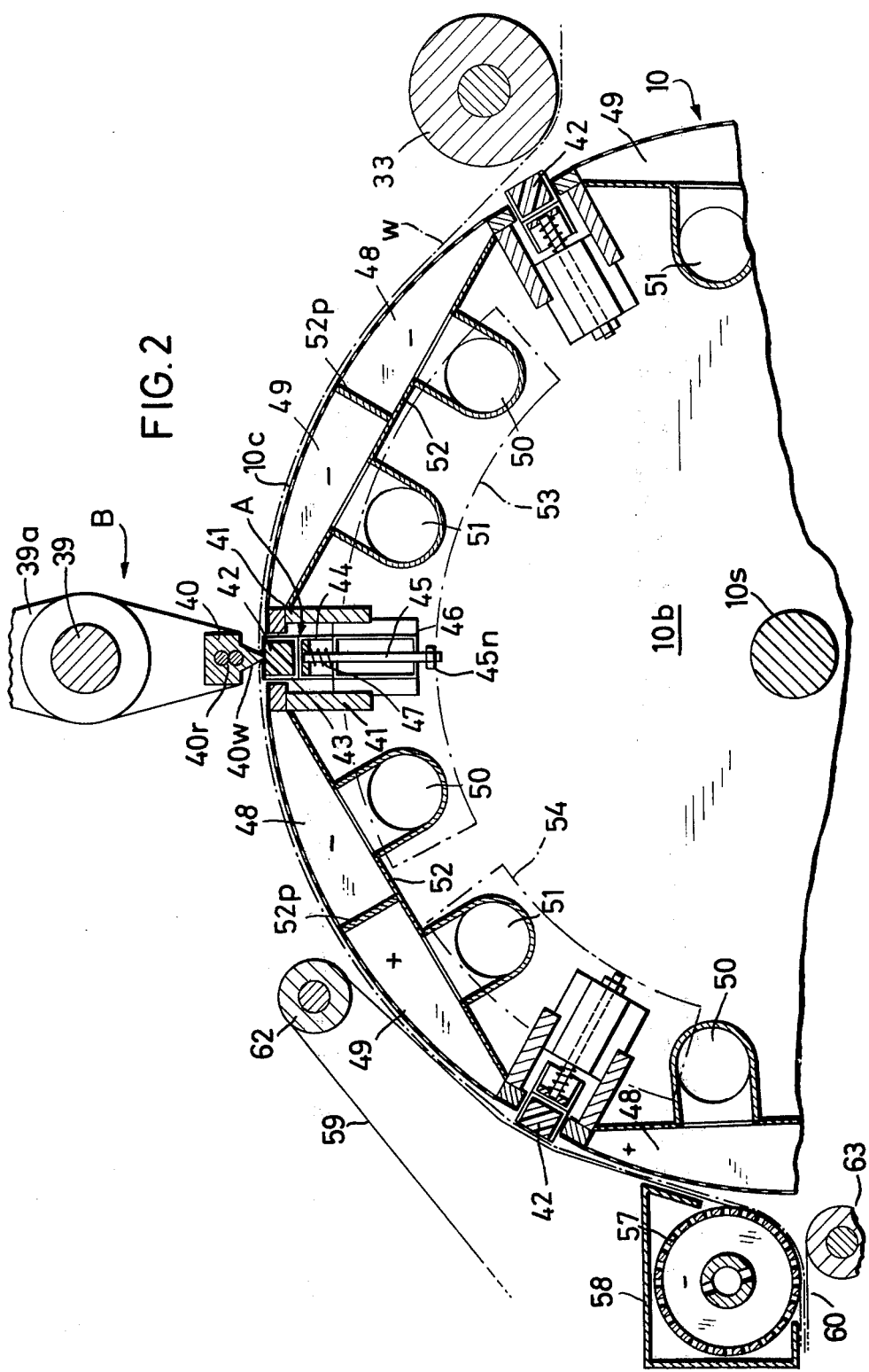

U.S. Patent May 17, 1977 Sheet 3 of 4 4,023,470
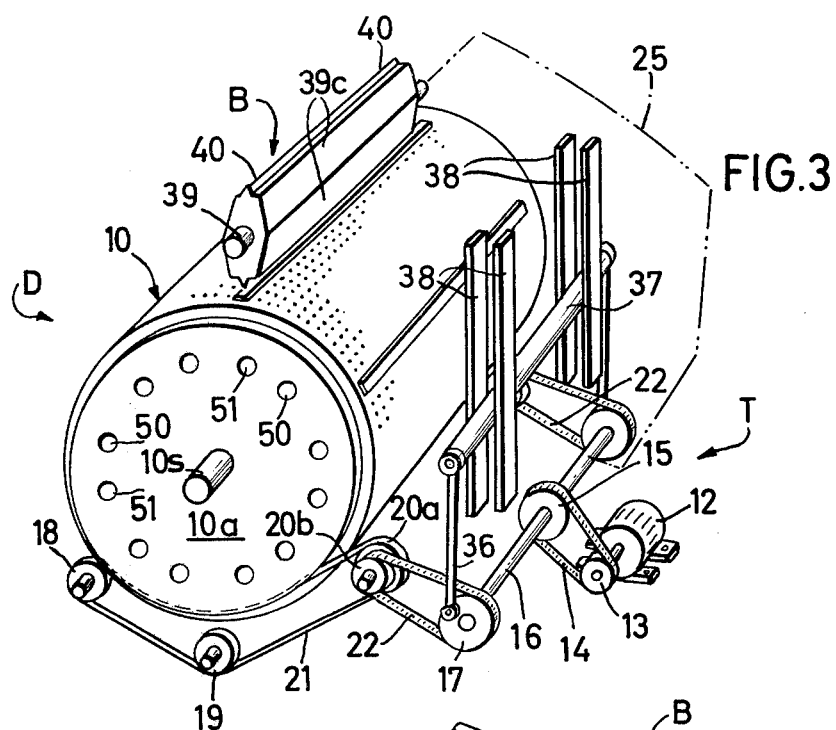
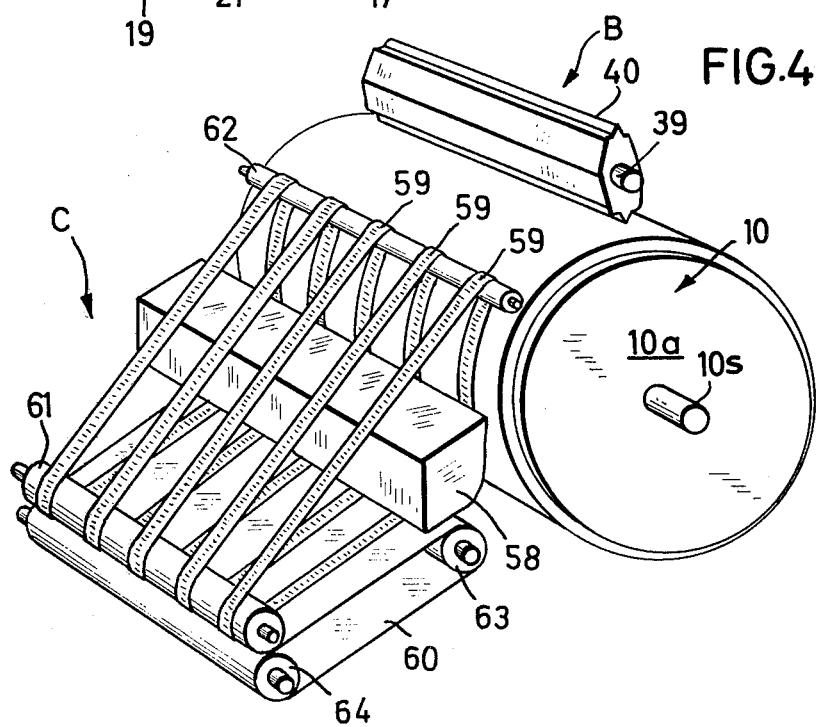

METHOD AND APPARATUS FOR CONTINUOUS PRODUCTION OF BAGS FROM THERMOPLASTIC FILM

Methods and apparatus are known for the continuous production of bags from a two-layered continuous web of synthetic thermoplastic film by passing the web onto a rotating drum where successive portions are seam-welded and severed in length corresponding to bags to leave the drum through appropriate discharge devices.

Thus for bottom seamed bags, a continous so-called tubular film may be fed onto the drum to be severed to bag length with a seam welding on one side of the severance line to form a bag bottom with the layers of the tube on the other side of the severance being left unwelded as the mouth of a succeeding bag, the bottom of which is seamed by a succeeding severance and/or welding operation. Also to produce side seam bags, the tubular film may be longitudinally slit along one edge, or an equivalent structure produced for feed to the drum by centrally folding over a long strip of sheet stock, forming a so-called half-tube web wherein seam welds are made along both sides of transverse severance cuts.

Methodwise by the present invention, advantageously the web is fed tangentially onto a rotating so-called welding drum under tension by deflecting the web, at a point between feed supply rolls and region of adherence to the drum, in a direction perpendicular to its plane forming a web loop, so that the web is drawn taut and flat and smooth on the drum surface, enabling high speeds in the web feed and other operations; and further at the time when seam welding is carried out the web tension is released by release of the loop, whereby an unstressed weld, hence a better seam weld, is achieved and damage is avoided which might otherwise arise from welding under tension.

Apparatus-wise the present invention provides, for carrying out the process of the character described, a machine of structure and mechanism in various points advantageously simple for the results achieved. Particularly there is provided a web-tensioning loop forming mechanism in association with a continuously rotating welding drum, both driven from a common power shaft which also, if desired, may actuate a welding bar device and other mechanisms in appropriately timed relation for the operations to be carried out.

The drum structure includes a perforated web-accepting circumferential surface shell above which normally slightly project a series of equispaced longitudinal resiliently mounted welding anvils, and the shell sectors between successive pairs of anvils are underlain by paired chambers to which suction or positive air pressure may be applied at appropriate points of the drum rotational position respectively to hold a web portion on the drum for operations to be carried out while developing a necessary reaction for web tension production, and subsequently by air flow and pressure aiding the removal of successive finished bags from the drum surface into a conveying belt type discharge mechanism.

The general object of the invention is to provide an improved method of the type described for the continuous production of plastic bags, and apparatus-wise to provide an appropriate apparatus for carrying out the method. A more particular object is to provide a method for continuous production of bags of the character described whereby a web is subjected to tension as it is being applied to a drum where seam welding and severance operations are to be carried out, and the web tension is relieved at or just prior to the time when seam welding is effected.

A further object of the invention is to provide a machine for continuous production of thermoplastic film bags from a double layer web wherein the web is fed tangentially onto a drum into a vacuum gripped condition, and including means for developing in the web, as it is so fed, a longitudinal tension drawing the drum-carried web portion taut and smooth on the drum circumference, and for thereafter releasing said tension at the time seam welding is effected.

A further object is to provide apparatus for carrying out thermoplastic film bag production in the manner described at high production rate and web speed while yet obtaining good or improved seam welds in the product bags.

A further object is to provide a machine in which certain drum mechanism structure, utilized in attaining proper taut application of the web on the drum surface, serves also as part of structure ensuring cleam pick-off of finished bags and their removal by a machine discharge mechanism.

Other objects and advantages will appear from the following description and the drawings wherein:

FIG. 2 shows the welding drum in fragmentary enlarged section taken in general perpendicularly to its shaft and rotational axis, and also showing the relative location of certain drum-adjacent components of the machine;

FIG. 3 is a somewhat schematic and generalized perspective representation of the drum, its drive mechanism and certain drum-associated components of the machine;

FIG. 4 is also a somewhat schematic generalized or schematic representation of the drum and a bag discharge mechanism associated therewith in the machine;

GENERAL ORGANIZATION OF MACHINE

Figure 1:
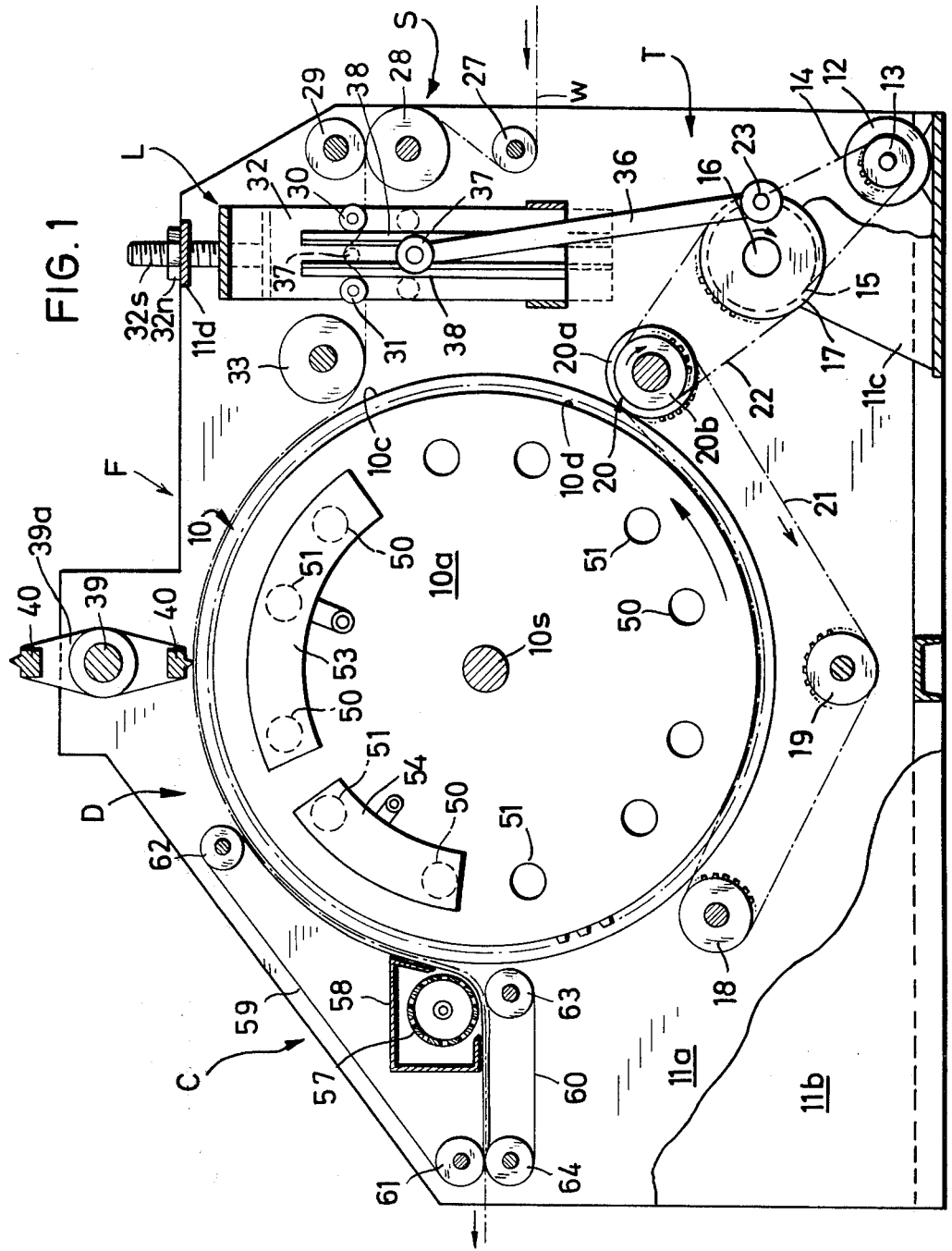
FIG. 1 is a side view, partially in elevation and partially broken away, of a machine for carrying out the method of and incorporating machine aspects of the invention.

The general organization of a machine, as one embodiment of certain apparatus features of the invention and for carrying out the process aspects of the invention, is best seen in FIG. 1, wherein a two-layered synthetic thermoplastic film web W (represented by dot-and-dash lines), appropriate for the bag type desired, through web advancing feeding mechanism S at the right of the machine frame F, is fed for vacuum gripping tangentially onto the circumferential surface of a continuously rotating drum 10 in a welding drum mechanism section D, wherein transverse weld seaming and severing operations are carried out at successive equal spacings on the web by a welding bar mechanism B, cooperating with anvils in a plurality of drum-carried anvil assemblies A (seen in FIG. 2) to separate successive web sections picked off from the rotating drum, as individual severed finished bag products, for removal and discharge by a conveying discharge mechanism assembly C. The machine further includes a web loop forming type web-tensioning device L disposed in the frame F on the web feed path to the drum assembly; and also a drive mechanism T for transmitting motion appropriately to the drum mechanism D, loop former device L, directly or indirectly to welding bar device B, and if desired to mechanism C and to the feed mechanism S, where at least one roll must be driven. The drum rotates counterclockwise in FIG. 1, with the corresponding motions of the other components being indicated by associated direction arrows in that and other figures.

Though nominally a certain primary function is attributed to each of these mechanisms or devices, certain components of some may in fact cooperate with components of another for achieving the nominal function ascribed to the latter.

WELDING DRUM ASSEMBLY D - DRIVE MECHANISM T

Drive mechanism T (see FIGS. 1 and 3) provides, first a continuous rotational driving of a hollow cylindrical drum unit, (designated 10 as a whole), rotatably supported in the parallel opposite vertical frame sides 11a, 11b at its opposite ends (through appropriate bearings not shown) by drum trunnions or the ends of a drum shaft 10s secured in and projecting through respective circular drum end walls 10a, 10b. The electric motor 12 through its drive pulley 13, an endless flexible element 14 and shaft pulley 15 drives an intermediate drive shaft 16 appropriately rotatably supported in frame brackets or pedestals 11c; and from like pulley wheels 17 on the outboard ends of shaft 16, motion is transmitted to the drum at a respective reduced diameter, circumferential drive engaging formations 10d at each shouldered drum end by further similar flexible element assemblies. Each of the latter comprises three pulleys rotatably supported by the frame, namely, idler pulley 18, tension pulley 19, double pulley 20, and an endless flexible drive element 21 mounted over 18, 19 and double pulley part 20a to provide between 18 and 20a an upper reach drivingly engaged with a sector or arcuate portion of the respective drum end drive formation 10d. Each double pulley 20 is driven from the respective drive shaft end pulley 17 by another endless flexible drive element 22 engaged on the double pulley part 20b.

The flexible elements 14, 21, 22 preferably are toothed timing belts or sprocket chains and the pulleys 12, 15, 17–20 are cog wheel type pulleys or sprocket wheels for a meshed tooth engagement with those flexible elements; and, with the drive engagement formations 10d on the drum ends being corresponding circumferential sets of teeth, the elements 21 in particular may be sprocket chains, or belts toothed on both inner and outer faces, to afford a positive drum engagement. A further drive connection at the central region of the drum underside may be made from shaft 16 through an analogous flexible drive element and pulley system appropriately modified at the drum, so as not to entail structure interferring with the anvil and web-accepting drum shell structures hereinafter described.

For driving the web tensioning mechanism L, a flat outboard end face of each shaft pulley 17 carries an eccentric pin or crank pin 23, on which a respective connecting rod 36 is pivoted; the axes of pins 23 being aligned.

The drives for the several moving sections are conveniently obtained directly or indirectly from the common drive source above described, though separate motion or drive sources may be used as long as appropriate controls are utilized to observe the respective motions and appropriately change the drives to keep such motions in proper phase or timed relations.

WEB FEED DEVICE AND TENSION MECHANISM

Except as noted, the next described group of rolls associated with the web path to the drum are either rotatably mounted through rotating shafts appropriately journalled in the frame sides or appropriately bearinged on stationary shafts supported by the frame sides. The incoming web (from an appropriately supported film supply source roll, not shown) passes about a first web guide roller 27, and upwardly, to go horizontally between and be drivingly engaged by a pair of parallel opposed feed rolls 28–29 (one of which is appropriately driven) thence through the loop former mechanism L where it passes under two operationally axially fixed loop former rolls 30, 31, rotatably supported as later described in a vertically adjustably shiftable frame 32 of device L; and from mechanism L under a guide roll 33 directing it tangentially onto the circumferential web-supporting and accepting surface 10c of the rotating drum.

The web tension producing loop forming device L includes the aforementioned rolls 30, 31 and frame 32; a roll 37, transversely engageable with the bottom of the web and, for vertical reciprocation to pass between 30–31 with its axis parallel to the drum axis, slideably guided at longitudinally spaced roll regions between respective pairs of vertical guide elements 38 forming slideways. These slideway elements may be fixed to the frame, but are here incorporated in and supported by the frame 32.

Cutboard of the slideways, the opposite ends of roll 37 are pivotally connected in the upper ends of the like connecting rods 36, whereby the roll 37 is reciprocated in a loop forming cycle for each rotation of the pulley discs 17 with drive shaft 16; once for each welding operation carried out by B.

Since the size of the loop formed, under given conditions determines the web tension developed, and itself depends upon the excursion of roll 37 past rolls 30–31, a loop and tension adjustment is provided by the vertical shiftability of 32 relative to frame F; as may be afforded, for example, by a jack screw 32s anchored on a top cross bar of the adjustable frame 32, and passing up through a machine frame cross beam 11d for threaded engagement by a rotatable adjusting nut 32n bearing on the top of the frame cross beam.

The position of roller 37 shown in solid lines in FIG. 1 (out of web contact, hence not in loop forming position) corresponds to the operative relations at that point in the bag forming cycle of the drum and the disposition (in web welding engagement position) of the weld bar assembly B; and its uppermost position indicated in dashed lines as positioned for forming the represented slight web loop is not consonant with the operative position of welding bar device B, which for the dotted roll and loop position would rather be at a position 90° from that shown.

DETAILS OF WELDING DRUM MECHANISM; WELDING BAR STRUCTURE

The welding bar device B, best seen in FIGS. 1 and 2, as a whole is rotatably supported between the frame sides and comprises a driven transverse shaft 39 carrying end plates 39a, and, secured endwise between plates 39a, outwardly facing like electrically heated welding bars 40 disposed longitudinally parallel to and at diametric locations relative to the shaft axis in a symmetrical overall structure; and preferably as in FIG. 3, enclosure plates 39c. The shaft has appropriate journalling endwise in the frame sides, and driving means of known appropriate type may be used including a drive transmission system connection from mechanism T, indicated by the dash-dot line 25 in FIG. 3.

Figure 6:
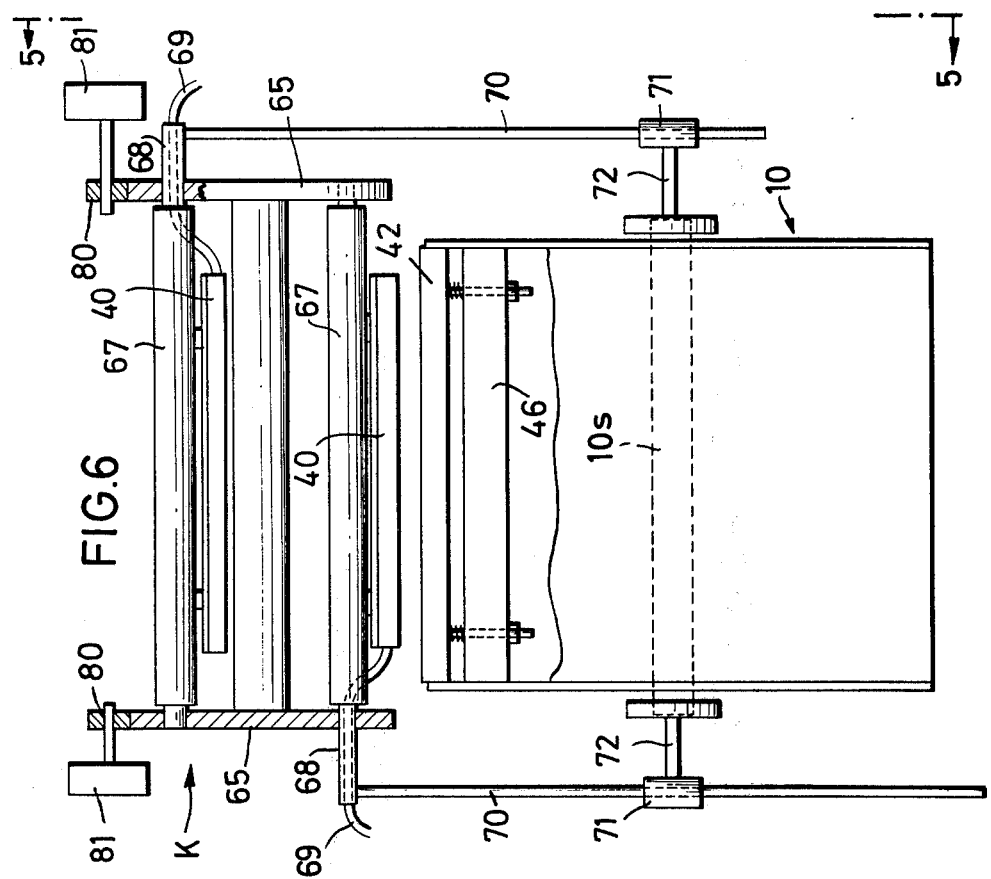
FIG. 6 is a view partly in elevation and partly in an irregular section taken as indicated by the line 6–6 in FIG. 5.

Bars 40 extend parallel to each other and to the coplanar axes of 39 and of 10s for the drum. Each bar 40 comprises an elongated metal body (see FIG. 2), enclosing a resistance heating element 40r, and on its outward face has a longitudinally coextensive triangular on wedge section shaped integral rib 40w forming the effective web-contacting welding part. Electric current may be supplied to the heaters by known various means, such as slip rings on the end plates or, as shown in FIG. 6, by conductors carried out through hollow shaft portions to external rotatable connectors.

The specific shape of rib 40w, as here shown with symetrically sloped side faces, is particularly adapted to a simultaneous web severance and seam welding, to form seams on the film material along either side of a severance line, as especially used for side-seam bag production; but if it is desired to produce say bottom seamed bags, the weld rib form may be changed to a known shape for severance with single beam welding at one side of the severance line, or to simple seam welding used in conjunction with a cutter.

Welding assembly B may be mounted with rotational axis fixed relative to the frame, being rotationally continuously or oscillatorily driven in timed relation to the drum at a rate and manner which brings one of the bar elements 40 into welding contact with the web on an anvil bar 42 as hereinafter described, so that bars 40 are alternately used. Or the shaft 39 may be intermittently driven, the assembly B being at rest say in a horizontal position 90° from that shown for a portion of the operating cycle. The assembly B is shown in FIGS. 1 and 2 positioned as in effecting a welding operation, at which time the web tensioning loop has been actually released.

Further the assembly B may be mounted for radial shift toward and away from the axis of rotation of the shaft 10s of the drum, with a welding bar 40 normally poised spaced slightly from the web surface and driven intermittently inwardly at appropriate times to move quickly into and out of welding contact, as upon a signal generated in response to an anvil position.

Figure 5:
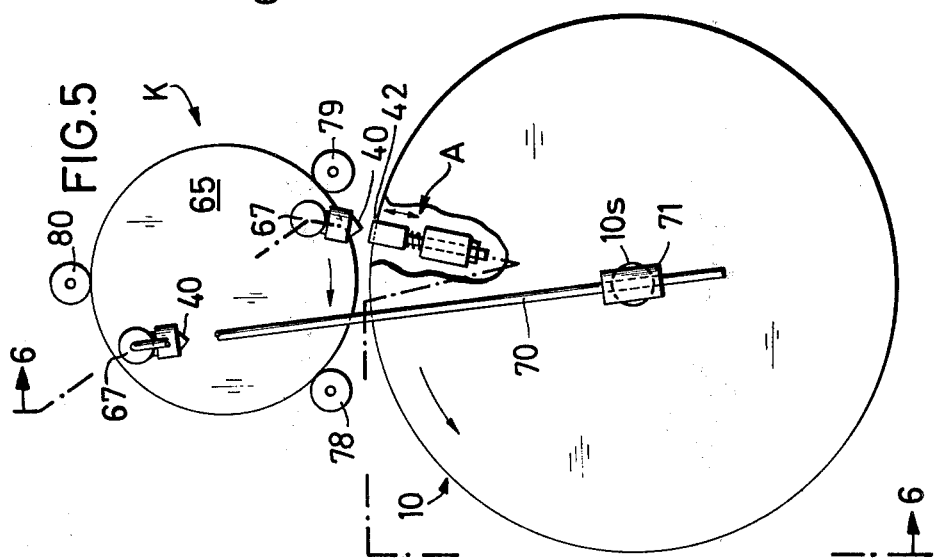
FIG. 5 is an end view of a drum represented in more generalized form but showing the essential structural features involved in a welding bar modification associated with the drum.

Whatever manner of actuation is used, here or for the modification of FIGS. 5–6, the assembly is to be clear of the web during the major part of a bag making cycle, and various known means may be used for that purpose and to ensure that the orbiting tangential speed of the bar is equal to or may accommodate to that of the drum, or that speed differences may be compensated for, at the time of welding contacts. Furthermore bags of lengths longer than the span between successive anvils may be made by controlling the drive of device B so that one or more anvils are skipped, as may be done by driving B at a lower rotational rate.

At 60° intervals around the drum circumference, welding anvil assemblies A are disposed in the respective equispaced six longitudinal slots formed between opposed pairs of longitudinal drum structural elements 41, such as bar and plate weldments secured endwise to the drum end walls 10a and 10b.

Each longitudinally extending anvil assembly A (see especially FIG. 2) comprises a bar element 42 as the anvil proper received in the top channel of a composite H-shaped support bar, constituted of a pair of back-to-back disposed, upper and lower longitudinal, like, flat bottomed metal channel elements 43, 44; at least two stud bolts 45 (see also FIG. 6), each with one end secured in the channel member 44 and other end extending through a guide aperture in a box section metal bar 46, secured endwise to the respective drum end discs; and around each stud, to outwardly bias the anvil proper to project slightly above the drum surface 10c, a helical compression spring 47 interposed between channel 44 and the section 46; and a stop nut 45n on inner end of each stud for adjusting the height to which the anvil surface normally projects above the web accepting surface 10c. The anvil elements 42 are preferably constituted of Silicone rubber or a like heat resistant elastomer.

The web-accepting drum surface 10c is provided by a series of several like curved perforated plate or thick sheet metal elements (also each designated 10c), each secured endwise to the drum end walls, and along its longitudinal edges to outer surfaces of the elements 40 at the adjacent sides of successive anvil assemblies; the series thus forming a circumferential drum shell. The perforations are small, numerous, closely spaced and uniformly distributed to the extent of a sieve-like character conferred on the drum surface.

The space between adjacent anvil structures and immediately beneath each perforated plate 10c is divided into a respective pair of semi-segmental chambers 48, 49 by a longitudinal sheet metal plate 52 with chord-like disposition over the drum length and a central longitudinal radial partition plate 52p between 10c and 52. Each chamber communicates through one or more apertures with a respective conduit 50 or 51; these conduits running to, and opening through mouths at, one or both drum end walls 10a – 10b for application of vacuum or pressurized air in the chambers (indicated by − and + signs in the drawing) as the mouths pass respectively a vacuum manifold chest 53 and a pressurized air manifold chest 54, each chest having relatively sealed sliding contact with, and being mounted on the frame side adjacent to, the drum end wall or walls through which the conduit mouths open. Vacuum or air pressure is continuously applied to the chests from appropriate suction or air pressure sources (not shown) for purposes to be explained.

Thus, as an inter-anvil section of the drum turns into a position where the web is being fed onto its circumference, the mouth of its respective conduit 50 or 51 passes under the edge of the suction chest 53, so that suction is applied through the perforations in 10c to hold the web in position. The arcuate length of the chest 53 is such that suction is maintained on the web portion corresponding to each chamber until it is advanced well past the welding station, that is, the device B. Thereafter as the web portion corresponding to each chamber has moved into that part of the operating region of the hereinafter described pick-off and discharge conveying device C, the respective chamber conduit mouth leaves the vacuum chest, and after becoming substantially clear thereof, then passes under the pressure chest 54, thereby to pressurize the chamber to above atmospheric pressure, for purposes hereinafter explained.

BAG PICK-OFF AND DISCHARGE CONVEYING MECHANISM C

The bag pick-off and discharge conveying mechanism C (see also FIG. 4 in conjunction with FIGS. 1 and 2) comprises a rotatably driven perforated hollow vacuum pick-off roll 57 mounted parallel and proximate to but spaced somewhat from the drum circumference; a roll housing 58, also mounted between the frame sides and longitudinally open toward the drum; a set of spaced endless pick-off tapes 59 reaved about the driven and idler support rolls 61–62 and roll 57; and a broad conveyor belt 60 reaved over the like horizontally spaced idler and driven rolls 63, 64; these rolls similarly being journalled endwise in or relative to the frame sides.

The belt 60 has a width equal to the drum length available for web width acceptance; but can be substituted by tapes corresponding to the tapes 59 in number and location. The rolls 57 and 62 are spaced from each other and slightly away from the drum with such spacings that the tape reach between 57 and 62 presses web material against a substantial arc of the drum. The horizontal reach of tapes 59 between rolls 57 and 61 running with and along the top reach of belt 60 (or respective tapes used in place of a belt) forms a discharge conveyor belt system with the tapes 59 and belt 60 driven at the same lineal speed equal to the drum surface speed. For roll 57, a hollow apertured shaft can be connected to the external vacuum source to supply suction to the web through the numerous uniformly spaced roll perforations.

When a chamber 48 or 49 comes into a position where the corresponding web portion is engaged and pressed by the tapes 59 against the drum circumference, that chamber then is pressurized by its conduit mouth passing under the air supply chest 54 to loosen that web portion from the surface 10c, by air application to th drum shell apertures.

Though loosened and moving at relatively high speed, the web portion is kept under the control of the tapes 59, with the severed leading edge of a web section behind a lifted anvil ready for pick-up at the roll 57. A leading edge, displaced outwardly against the tapes 59 by a respective outwardly biased anvil 42 in conjunction with pressurized air flow through the drum surface apertures, thus follows the tapes onto and becomes subject to the vacuum gripping influence of roll 57, and accordingly is carried around roll 57 to pass gripped between the opposed parallel reaches of tapes 59 and belt 60 to discharge from the machine.

For this purpose, the arcuate length of the air chest 54 is such that positive air pressure is maintained in a chamber 48, and especially in a chamber 49 with which a leading severed web section edge may be associated, say until the associated anvil structure has just passed the roll 57.

MODIFICATION OF FIGS. 5-6 IN WELDING BAR DEVICE STRUCTURE

In place of the welding bar mechanism previously described with respect to FIGS. 1–3, there may be used the modification of FIGS. 5–6, somewhat generalized and schematic, inasmuch as they do not represent, for example, shapes and spacings required in the drum structure of its support in the frame and for accommodation of other previously described components.

In FIGS. 5–6, a cage or spool-like assembly K is comprised of a pair of like circular end discs or plates 65 secured coaxially on opposite ends of a rigid longitudinal spacer 66; and, at like radial spacings from and at diametric locations relative to spacer 66, two shaft-like support bars 67, each carrying a weld bar element 40 similar to a bar 40 described with respect to FIGS. 1–2, and each rotatably mounted at reduced end pivot portions in the discs. Though each disc 65, a pivot of a respective support 67 projects as a hollow extension 68, receiving flexible supply cables 69 running from an external power source to the welding bar heater.

Because the cage as a whole is rotatably supported and driven as hereinafter described for welding or welding-severing contacts with the web, to insure that each welding bar 40 approaches an anvil 42 in a plane through the drum rotation axis, that is, the axis of shaft 10s, at the outboard end of each extension 68 there is rigidly secured a radial guide rod 70 extending (coplanar with the centerlines of the respective weld bar rib and support bar) into a slideway collar 71 swingably supported by pivoting means 72, having a pivot axis coaxial with the axis of shaft 10s, and intersecting the rod centerline which accordingly is also maintained radial to the drum axis. Each rod 70 is long enough to remain engaged in the collar 71 as it reciprocates upon cage rotation.

Here each pivot means 72 for simplicity is shown as supported by a bearing cap element rotatably on a respective end of drum shaft 10s, though other means of such support, say through the frame as such, are obviously available.

Each end of the cage structure K is similarly rotatably supported and driven by peripheral engagement of the respective end disc 65 on spaced support rollers 78–79, and with a rotating drive element 80 driven by a motor 81; the rotating element 80 having a non-slip engagement, as may be afforded by providing the end disc periphery with a ring gear formation to be meshed with the element 80 as a pinion, as well as a smooth portion for support roller engagement; or by forming the disc edge and rolling elements 78, 79, 80, toothed as gears for appropriate mesh, as alternatives to cylindrical cooperating surfaces on 78, 79, and 65, in conjunction with a frictional driving engagement by 80, which would require appropriate speed and phase controls for the motion of assembly K relative to drum 10, or more specifically, of the weld bars 40 relative to anvils 42, because of the possibility of frictional drive slippage.

Thus, as cage K rotates bringing bars 40 alternately into operative disposition and engagement with the web on successive or selected anvils 42, since each guide rod 70 maintains the respective weld bar edge coplanar with the drum axis and also since the centerplane, of each anvil bar 43 is also a radial plane including the drum axis, therefore, each welding bar 40 and its edge must approach any anvil in the radial centerplane of anvil radial shiftability relative to the drum axis.

OPERATION

Considering as a starting point for descriptive purposes the condition and position of elements shown (with a weld and severance just being completed by device B), for the adjustment of device L prevailing, roll 37 is out of contact with the web end, the web is actually moving to the left through device L beneath rolls 30–31 without induced tension, so that an improved welded seam is attained.

As the drum continues counterclockwise in its rotation, the just used weld bar 40 recedes from the web by rotation or by radial shift, depending upon the drive used, and additional web is drawn under 33 onto the drum as the vacuum gripped unsevered now leading end advances past weld station B. Loop forming roller 37 comes into contact with the web, advancing it upwardly between 30, 31 hence increasing the feed path length from the supply rollers 28–29 to the drum surface and producing a loop and web tensioning.

Where the drum peripheral velocity is slightly greater than the web feed linear speed through rolls 28–29, there would of course necessarily be some slippage of the web on the drum and accordingly some web tension developed, even without action of roll 37. However, the loop forming action of roll 37 increases the slippage and tension developed under the frictional force on the drum under the normally directed forces developed between film and drum surface by the suction, hence external atmospheric pressure. This tension applies the web, under control, smooth and taut on the drum. As an anvil on which the next welding is to occur approaches the weld station at B, descent of roller 37 occurs, thus freeing the loop and tension for the time of web seam welding and severance.

With the web fed by rolls 28–29 at the same linear speed as the peripheral velocity of the drum, there is no special tension developed in the web until the roll 37 contacts the web. However, once the web is roll-engaged and is being deflected upwardly into a loop, web tension is thus developed to tighten it smoothly down on the drum, as previously with reaction for tension production by roll 37 supplied by the grip of the feed rolls at one side of L and the frictional sliding forces of the web on the drum surface at the other side. Loop and tension release occur upon retraction of roll 37 in its crank-induced reciprocation cycle.

Thus the web tension in either case is substantially completely released before, or at least during and before completion of, the welding operation.

The severed bag section beyond the welding device B (that is, to the left of B in FIG. 2) having advanced to the position shown, its trailing part above the chamber 48 immediately to left of B is yet under suction. However, its leading portion above the respective chamber 49 has moved past roll 62, where its forward portion is engaged by the adjacent reach of tapes 59 to be held on the drum after vacuum release. For the position shown, air pressure has just been applied tending to free the forward end which is, however, being kept under tape control. Air pressure and escaping air at the forward end adjacent the anvil 42 shown at the extreme left in FIG. 2 lifts the web free edge out away from the surface in conjunction with the outward biased movement of 42 as previously described, ensures bag pick-off, with continued rotation beyond the position shown in FIG. 2 as the tapes recede from the drum surface to pass over roll 57; whence, by the horizontal conveying belt, the bags are discharged from the machine, as may be desired onto appropriate further devices for stacking or handling.

With this method and machine, continuous high speed bag forming operations can be carried out not only on a two layer web with the layers joined along only one longitudinal edge, the other longitudinal edge being free, as provided either by sheet strip stock folded over and centrally longitudinally onto itself as a double layered web, or by a longitudinally edge slit flattened film tube as the web, in either of these cases for producing side seam bags, or also on an unslit flattened film tube as the web with appropriate form of the welding bar edges, for producing so-called bottom-seamed bags, but also on a flattened film tube centrally longitudinally slit, in effect forming two parallel coplanar double layered webs, for producing two side seam bags at a time if desired.

In addition to the expedient of operating the welding bar assembly to skip anvil contacts for production of bags longer than the arc length between two successive anvils, a bag length selection is available by selecting the extent of slip between web and drum, that is, the excess of the drum peripheral speed over the linear speed at which the web is fed by the rubber or rubber-faced feed rolls 28–29. Thus bags shorter than that inter-anvil arc may be produced; or, in conjunction with skipping of contacts, so also bags of lengths intermediate multiples of the inter-anvil arc length.

When the operation with two or more webs is contemplated, the previously described further flexible elements likewise drivingly engaging the drum in non-slip manner may be used at a location or locations between the drum parts accepting the respective webs. For this purpose, each anvil, whether or not yieldably spring mounted, is in effect divided into two aligned halves, as a convenient expedient to accommodate the middle flexible drive element.

It is observed that insofar as the web tensioning and release, as provided by the timed loop former device is concerned, the resiliently yieldable mounting of the anvils is not essential.

However, it is noted that at the location of a yieldably mounted projecting anvil, the portion of the web, rising from the drum to pass over the anvil and then returning to the drum, represents a greater total length than the corresponding arc length at the drum surface, so that depression of a web supporting anvil radially inwardly by welding bar contact can slacken the web and in some degree relieve web tension. This effect may be merely additive to a primary and basically sufficient action of the loop former, or provide some degree of assurance of tension release; but also it may be used independently of a loop former where the extent of radial inward and outward excursion permitted to the anvil by its mounting, and the timing of the welding heat development provides the effective welding action when anvil depression has released tension.

I claim:

1. In a method for continuous production of bags from thermoplastic synthetic film in the form of a continuous longitudinally advanced two-layer web with the film layers continuously joined along at least one longitudinal edge of the web, from the leading end of which web bags are successively made by transverse seam welding carried out at respective equal spacings on and running continuous across the web width and a separation of a resulting bag, with the seam welding forming a bag bottom for bottom seamed bag production from a flattened tube as the web, or forming a respective side seam simultaneously in two successive side-seamed bags produced from a web with layers unjoined on one longitudinal edge, the said film web being fed tangentially onto the outer circumference of a welding drum rotating with a peripheral speed equal to or greater than the web feed speed, for carrying out on the drum circumference both the transverse seam welding over its entire width, and as well a web severance into successive bags, the important comprising:

drawing the film web taut on the welding drum as each length portion corresponding to a bag to be produced is being drawn onto the drum, by displacing the film web being fed to the drum, in a region near to the place where the web is fed onto the drum, in a direction perpendicular to the plane of the web to form a tensioned loop, and shortly before the welding is effected, releasing the loop thereby to release tension in the film web portion about to be welded.

2. In a method improvement as described in claim 1, establishing the tension in the taut web by selecting the dimension of the loop which is formed.

3. Apparatus for continuous fabrication of bags from a longitudinally advanced two-layer web of synthetic thermoplastic film, either a flattened film tube as a web from which bottom seamed bags are separated or a web comprising two film layers longitudinally continuously joined along one, and free along the other of the longitudinal edges of the web, said apparatus comprising:

a frame having two parallel spaced sides;
a continuously rotationally driven welding drum;
having at opposite ends trunnions or respective shaft portions journalled in the respective frame sides;
said drum having a plurality of elongated welding anvil elements extending parallel to the axis of drum rotation and equi-spaced about its circumference, each anvil resiliently mounted in the drum to be radially shiftable toward and away from the drum axis, and biased outwardly to a normal position raised slightly above the drum surface;

paired web feeding rolls spaced from the drum, rotatably mounted between the frame sides with axes parallel to the drum axis and including at least on driven roll;

a fixed web guide roll mounted in the frame proximate to the drum for directing the fed web tangentially onto the drum;

welding bar means
    mounted on the frame adjacent the drum and spaced from the guide roll in the drum rotation direction providing a welding bar element shiftable toward the drum parallel to the drum axis to make welding contact with a film web portion on a said anvil transiting said welding bar means;

said drum shell having numerous fine, closely spaced apertures therethrough to the circumferential web accepting supporting surface and having chambered space therebeneath between successive anvils;

means associated with the drum to apply web-holding suction through said apertures to a web portion on the drum in the region between said guide roll and a region beyond said welding bar means;

web tensioning loop forming means comprising
    a pair of spaced parallel fixed loop former rolls disposed on one side of the web path from said feed rollers to said guide roll, and having operationally fixed axes,
    a third loop former roll reciprocatingly shiftable in parallel disposition to the said fixed pair of rolls and engageable with the other side of the web to form a web tensioning loop tightening the web portion onto the drum;

means for driving
    said drum rotationally, said third roll reciprocatingly, and said welding bar means for approach to said drum anvils in mutually timed relation, to tension said web by loop formation as it is being fed onto vacuum-held relation on the drum, and to release said loop and thereby web tension as a welding bar makes welding contact with a web portion on a said anvil.

4. Apparatus as described in claim 3, wherein in each region between successive anvils the welding drum is provided with a respective pair of chambers having openings to and distributed over a respective web-accepting surface portion of the drum;

which chambers are selectively subjected to vacuum or air pressure for holding the fed web on or freeing web portions from the drum.

5. Apparatus as described in claim 4, which for discharge of successive finished bags from the apparatus, includes a bag discharging conveyor belt leading away from the drum region; and disposed adjacent to the outer circumference of the drum, a rotating suction roll to transfer the successive bags from the drum to said conveyor belt;

a set of driven parallel endless web and bag control tapes providing, in the region between the welding bar means and the said suction roll, a reach bearing on the drum exterior to engage finished bags lying therebetween, said tapes guiding finished bags to said suction roll for feeding to the said conveyor belt.

6. Apparatus for continuous fabrication of bags from a longitudinally advanced two-layer web of synthetic thermoplastic film, either a flattened film tube as a web from which bottom seamed bags are separated or a web comprising two film layers longitudinally continuously joined along one, and free along the other of the longitudinally edges of the web, said apparatus comprising:

a frame and a welding drum mounted in the frame and rotationally driven;

said drum having
    a circumferential generally cylindrical web-accepting surface, and
    means to retain a film web portion, accepted on the said drum surface, for advance with the drum periphery;

web feeding and guiding means spaced from the drum,
    including a fixed web guide mounted in the frame proximate to the drum for directing the web tangentially onto the drum, and also
    including a driven feed roll;

welding bar means
    supported by the frame at a location circumferentially spaced about the drum in the rotation direction from the guide means and actuated to make successive bag seam welding contacts transversely on the web drum-carried past said welding bar means; and web-tensioning loop forming means disposed in the frame along the web path between said feed roll and the point of weld feed onto the drum, the last said means including a web-contacting roll, disposed parallel to the feed roll, reciprocating perpendicularly to its axis and to the web feed path in timed relation to actuation of the weld bar means to produce a web loop thereby tensioning the web for tautening it on the drum as it is being applied thereto after a preceding welding actuation and to release the loop and consequently web tension before completion of a succeeding seam welding on the web.

7. Apparatus as described in claim 6 including drive mechanism for the reciprocating loop forming web contacting roll; said drive mechanism including a slideway guiding said contacting roll linearly relative to the frame, a crank pin driven by a main drive shaft, and a connecting rod between the crank pin and the said web contacting roll;

said main drive shaft also mediately driving the welding drum.

8. Apparatus as described in claim 7, wherein:

driving of the welding drum from the main shaft is provided by an endless flexible drive element having a reach applied over a sector of the outer circumference of, and having a non-slip driving connection with, the welding drum, said drive element being mounted over a first and a second rotating element to define said reach and over a third rotating element as a tensioning device; and another endless flexible drive element mounted over said first rotating element and over a rotating element on said main shaft providing a non-slip driven from the shaft to the first said flexible element.

9. Apparatus as described in claim 5, wherein said welding drum includes a plurality of longitudinal welding anvils equally spaced about its circumference, and means resiliently mounted each anvil in the drum operatively shiftably radially in a plane including the drum axis; and wherein said welding bar means includes a welding bar displaceable towards the drum axis;

each anvil being normally biased to project slightly above the outer circumference of the drum.

10. Apparatus as described in claim 9, wherein the said welding bar means is constituted as a welding bar disposed parallel to and rotating about a fixed axis which is parallel to the drum axis.

11. Apparatus as described in claim 10, wherein said welding bar means is comprised of a cage rotating about an axis parallel to the drum axis;

a plurality of welding bar assemblies supported by the cage adjacent the region of and spaced on its outer circumference; said welding bar assemblies being swingable or rotatable in the cage in such fashion that a respective welding bar of each assembly has a welding edge directed constantly toward the rotational axis of the welding drum;

whereby the welding edges of the welding bars in approaching anvils move in a disposition coplanar with and parallel to the drum axis.

12. Apparatus as described in claim 11, wherein to each said welding bar assembly there is rigidly connected a respective guide rod extending radially to the rotational axis of the assembly in the cage, and coplanarly with the last said rotational axis and the respective welding bar; each said guide rod being slidably supported in a slideway extending radially to and pivotal about the drum shaft axis.

13. Apparatus as described in claim 12, wherein said cage includes circular discs as respective end walls; and said cage is rotatably supported at both ends by a set of rollers engaging the external circumference of a respective disc.

14. Apparatus as described in claim 9, wherein in each region between successive anvils the welding drum is provided with a respective pair of chambers having openings to and distributed over a respective web-accepting surface portion of the drum;

which chambers are selectively subjected to vacuum or air pressure for holding the fed web on or freeing web portions from the drum.

15. Apparatus as described in claim 5, which for discharge of successive finished bags from the apparatus, includes a bag discharging conveyor belt leading away from the drum region; and disposed adjacent to the outer circumference of the drum, a rotating suction roll to transfer the successive bags from the drum to said conveyor belt.

16. Apparatus as described in claim 15, including a set of driven parallel endless web-control and bag-control tapes providing, in the region between the welding bar means and the said suction roll, a reach bearing on the drum exterior to engage finished bags lying therebetween, said tapes guiding finished bags to said suction roll for feeding to the said conveyor belt.

17. Apparatus as described in claim 6, wherein: said loop forming means includes a pair of axially fixed loop former web guide rolls disposed on one side of the web path and on opposite sides of the reciprocating path of the loop forming web contacting roll;

said fixed rolls being adjustable in position along the path of the web contacting roll reciprocation for adjusting the loop size and thereby the developed web tension.

18. Apparatus as described in claim 9, wherein each said anvil as biased normally projects above the outer surface of the drum to loop a web running thereover sufficiently to afford web tension release upon anvil depression upon welding bar contact with the web on a said anvil.

* * * * *